United States Patent [19]

Desser et al.

[11] Patent Number: 5,322,345
[45] Date of Patent: Jun. 21, 1994

[54] REMOVABLE MOTORCYCLE FENDER SEAT

[76] Inventors: A. Wilhelm Desser, 274 Madrona, Apt. No. 6, Chula Vista, Calif. 91910; Dale M. Duyck, 4234 Stu Ct., San Diego, Calif. 92154

[21] Appl. No.: 108,299

[22] Filed: Aug. 19, 1993

[51] Int. Cl.⁵ .............................................. B62J 1/18
[52] U.S. Cl. ................................ 297/214; 297/219.1; 297/352; 248/206.3
[58] Field of Search .............. 297/214, 195.13, 195.12, 297/215.16, 4, 256.16, 352, 440.22, 243, 395; 24/303; 248/205.5, 205.6, 250.7, 206.2, 206.3, 206.5

[56] References Cited

U.S. PATENT DOCUMENTS

| | | |
|---|---|---|
| 245,133 | 7/1977 | Kerley . |
| 1,095,172 | 4/1914 | Stoll . |
| 1,662,718 | 3/1928 | Regard . |
| 2,109,571 | 3/1938 | Le Boeuf . |
| 2,645,781 | 7/1953 | Mover ................................. 297/352 |
| 2,966,938 | 1/1961 | Ooton .................................. 297/352 |
| 3,269,773 | 8/1966 | O'Connor ........................... 297/214 |
| 3,712,670 | 1/1973 | Svehla et al. . |
| 4,863,130 | 9/1989 | Marks, Jr. .......................... 248/206.3 |

FOREIGN PATENT DOCUMENTS

| | | | |
|---|---|---|---|
| 4031221 | 4/1992 | Fed. Rep. of Germany ...... 297/214 |
| 2441365 | 6/1980 | France ............................... 297/219.1 |
| 2551716 | 3/1985 | France . |
| 482855 | 7/1954 | Italy . |

Primary Examiner—Laurie K. Cranmer
Attorney, Agent, or Firm—Richard C. Litman

[57] ABSTRACT

The present device is a removable motorcycle fender seat that allows owners of any motorcycle having a rear fender assembly to removably install a second, auxiliary seat. This seat is constructed of lightweight material and is affixed to the fender of a motorcycle by a plurality of suction cups as well as through forces exerted by a magnetic sheet that is incorporated near the bottom, fender engaging, base member of the seat. This seat will further allow the owners of such motorcycles to install and remove the seat without causing any damage to the fender or requiring modification of the same to receive the seat. In additional embodiments, the fasteners utilized are either the magnetic strip alone or the plurality of suction cups alone.

15 Claims, 3 Drawing Sheets

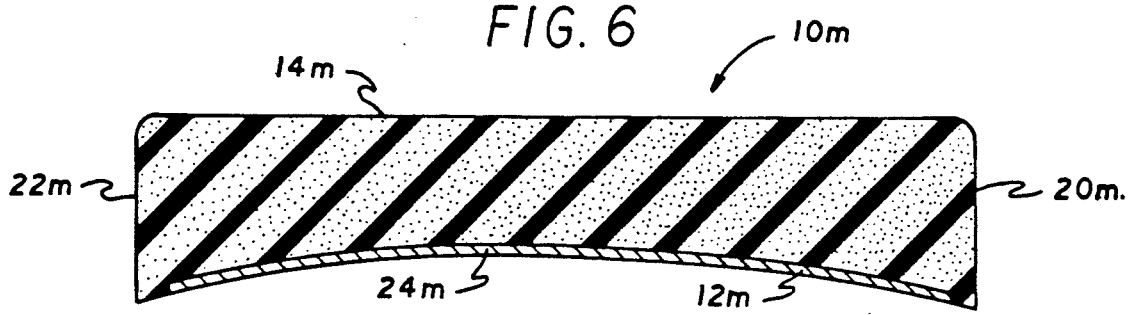
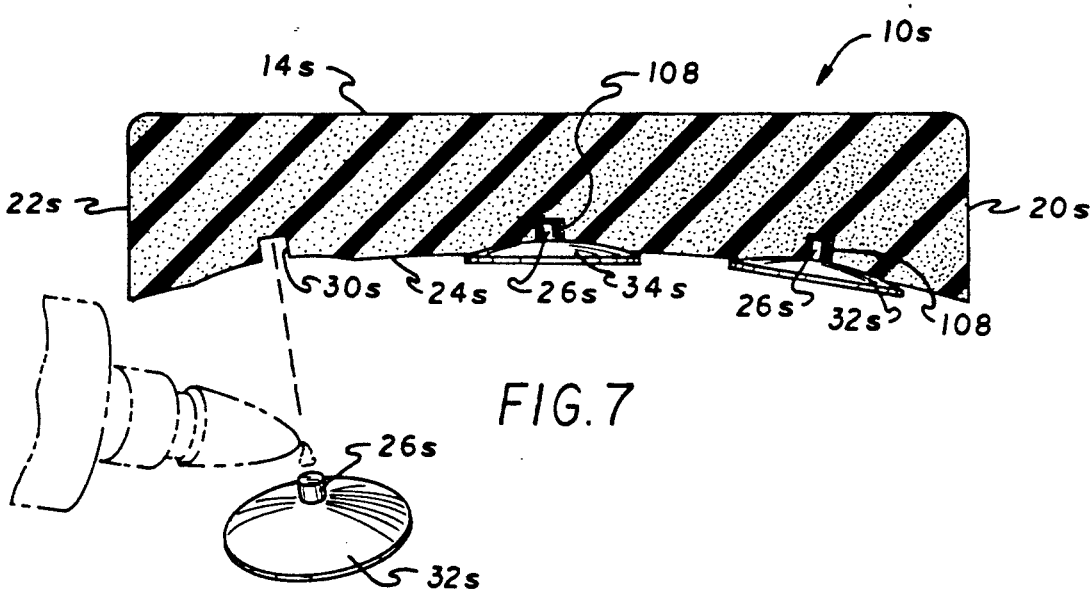

REMOVABLE MOTORCYCLE FENDER SEAT

BACKGROUND OF THE INVENTION

1. Field of the Invention

The present invention relates to auxiliary seats for use with fendered motorcycles. Specifically, the present invention relates to a removable auxiliary seat for fendered motorcycles that will not damage or permanently mark the fender when in use.

2. Description of the Prior Art

Upon review of the patent record, it has been noted that auxiliary seats for motorcycles and seats mounted to the rear fender of a motorcycle have been the subject of earlier patents.

U.S. Pat. No. 1,662,718, issued on Mar. 13, 1928 to G. L. Regard, discloses a motorcycle having two seats. The rear seat is seen as a folding seat that is secured to the fender by a plurality mounts that engage the fender (illustrated in FIG. 1). In addition, Regard's rear seat is supported by a seat frame assembly that originates adjacent the engine, supported mid-way at a point where the rear wheel is supported by the motorcycle frame itself, and continues upward in an arcuate manner until reaching the fender just behind the rear seat. This rear seat, however, is permanently affixed to the motorcycle such that removing the seat would not only be a grueling task, but also would leave a damaged or permanently marked fender.

U.S. Pat. No. 3,712,670, issued on Jan. 23, 1973 to Paul W. Svehla et al., discloses a removable motorcycle seat attachment for a motorcycle. Svehla's seat is removably attached to the original seat that is mounted permanently using "brackets or similar fastening members (not shown) for attachment to a frame portion or other structural member on the motor vehicle M." Thus, it is noted that Svehla's seat removably attaches to an already in place and permanently secured seat.

Italian Patent No. 482,855, issued July 1954, discloses a adjustable motorcycle seat assembly. In addition, an auxiliary rear seat is seen as being attached by bolts to the fender of the motorcycle. As was the case in above mentioned U.S. Pat. No. 1,662,718, the present reference provides a rear fender seat that is permanently attached to the rear fender of the motorcycle and removal of the same would permanently disfigure the fender of the motorcycle.

Furthermore, U.S. Pat. No. 2,109,571, issued on Mar. 1, 1938 to George H. LeBoeuf, discloses an automobile baggage carrier that is attached to the roof of an automobile by a plurality of suction cups and straps. The suction cups are connected to the baggage carrier in such a manner that they may be adjusted vertically so as to accommodate a number of different shaped automobile roofs.

None of the above inventions and patents, taken either singly or in combination, is seen to describe the instant invention as claimed.

SUMMARY OF THE INVENTION

As the use of the motorcycle becomes more popular, more and more individuals are buying and riding motorcycles. A problem encountered with some motorcycles is that the only seat incorporated into the motorcycle at manufacture was for one individual, the driver. The present invention provides an additional seat for any motorcycle having a rear fender in such a manner that it is easy to use, appealing to the eye, and comfortable to the individual riding thereon.

Accordingly, it is a principal object of the invention to provide a comfortable, removable, fender seat for a second rider on a motorcycle. The removable fender seat must be able to be easily attached to a rear fender of a motorcycle is such a manner that no permanent damage or markings remain upon the fender after the fender seat has been removed.

It is another object of the invention to safely accomplish the principal object of the invention through the utilization of suction cup fastening means as well as a magnetic, plate-like insert so that the fender seat will be safely but still removably secured to the rear fender of the motorcycle.

It is a further object of the invention to construct the fender seat in such a manner that it is extremely lightweight and has an uncomplicated construction. The light weight of the removable fender seat will further enhance the ability of a single individual to remove and install the fender seat, quickly and easily, off of and onto the rear fender of the motorcycle.

Still another object of the invention is to create such a removable fender seat such that its outward appearance does not inadvertently affect the aesthetic appearance of the motorcycle onto which it has been installed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is a sectional view of a second embodiment of the removable motorcycle fender seat utilizing only a magnetic sheet for retaining the seat to a motorcycle.

FIG. 7 is a sectional view of a third embodiment of the removable motorcycle fender seat utilizing only a plurality of suction cups for retaining the seat to a motorcycle.

Similar reference characters denote corresponding features consistently throughout the attached drawings.

DETAILED DESCRIPTION OF THE PREFERRED EMBODIMENTS

Figure 1:
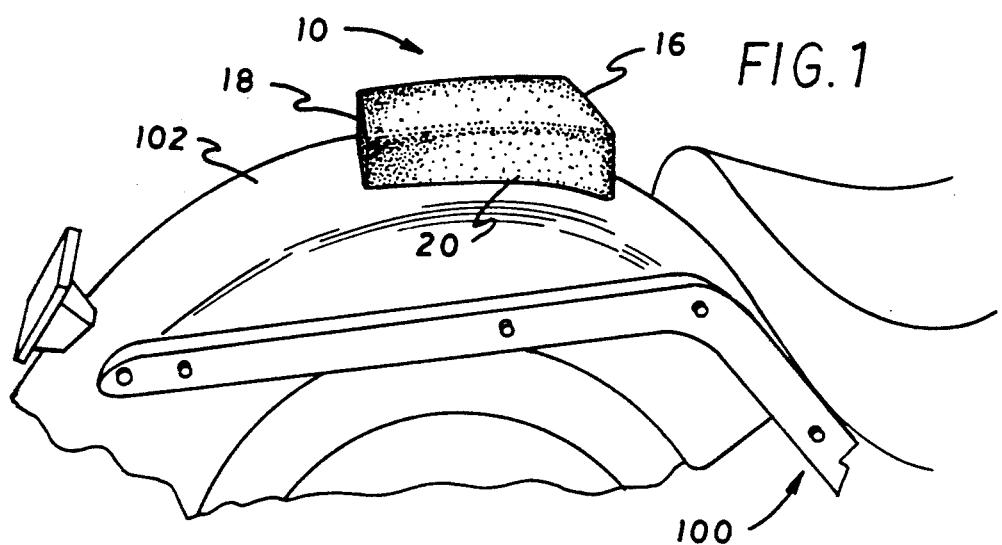
FIG. 1 is an environmental perspective of the removable motorcycle fender seat in place upon the rear fender of a motorcycle.
Figure 2:
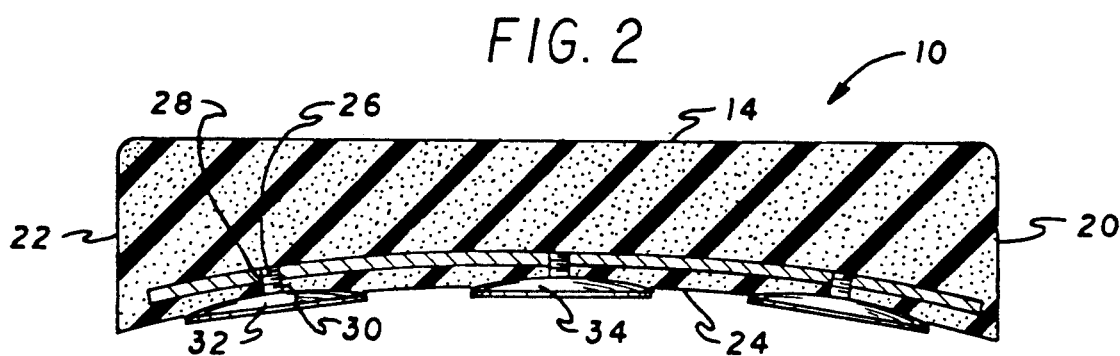
FIG. 2 is a sectional view of the removable motorcycle fender seat taken along lines 2—2 of FIG. 3 showing the arcuate nature of the base member.

The present invention provides a means for transporting an additional passenger on a second seat that has been removably attached to the rear fender of a motorcycle that has been manufactured with only one passenger seat mounted to the frame of the motorcycle. The additional passenger sits upon a removable motorcycle fender seat 10, incorporated onto the rear fender of the motorcycle, see FIG. 1. Fender 102 is seen as having both longitudinal and lateral radii of curvature. Longitudinally, fender 102 has substantially the same radius of curvature as the rear wheel of motorcycle 100. In additionally, fender 102 is laterally arcuate, having substantially the same radius of curvature of the top of the motorcycle tire from tire sidewall to tire sidewall.

Removable motorcycle fender seat 10 is constructed of a moldable plastic or molded closed-cell, foam-like, composition for light weight and comfort. Fender seat 10 is seen as having a substantially rectangular, but tapered, block construction. The top surface 14 of fender seat 10 is a flat planar surface that when appropriately place upon fender 102 of motorcycle 100, provides a horizontal seat for the second rider of motorcycle 100. Extending downward from top surface 14 of fender seat 10 are four sidewalls 16, 18, 20, and 22: a first, front wall 16; a second, rear wall 18; a third right facing wall 20 (with respect to the driver of the motorcycle); and a fourth left facing wall 22. Finally, the bottom of fender seat 10 is seen as base member 24.

Figure 3:
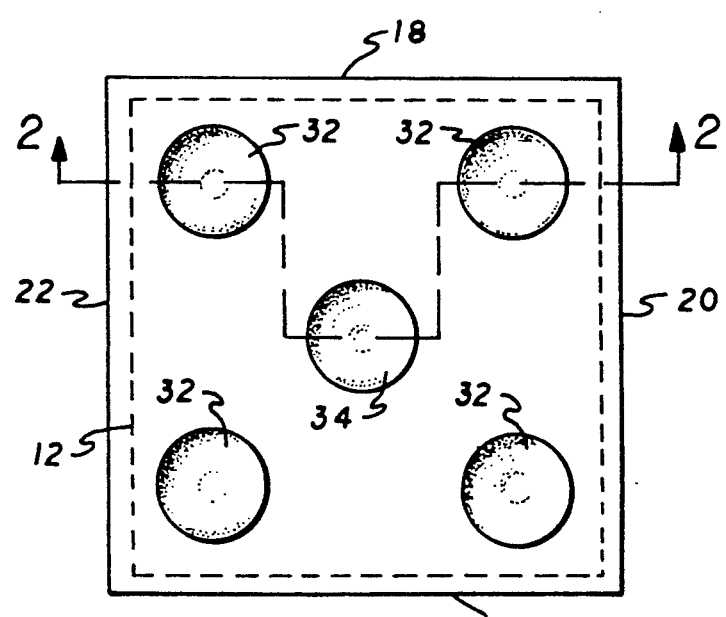
FIG. 3 is a bottom view of the removable motorcycle fender seat showing the suction cup pattern on the bottom thereof.
Figure 4:
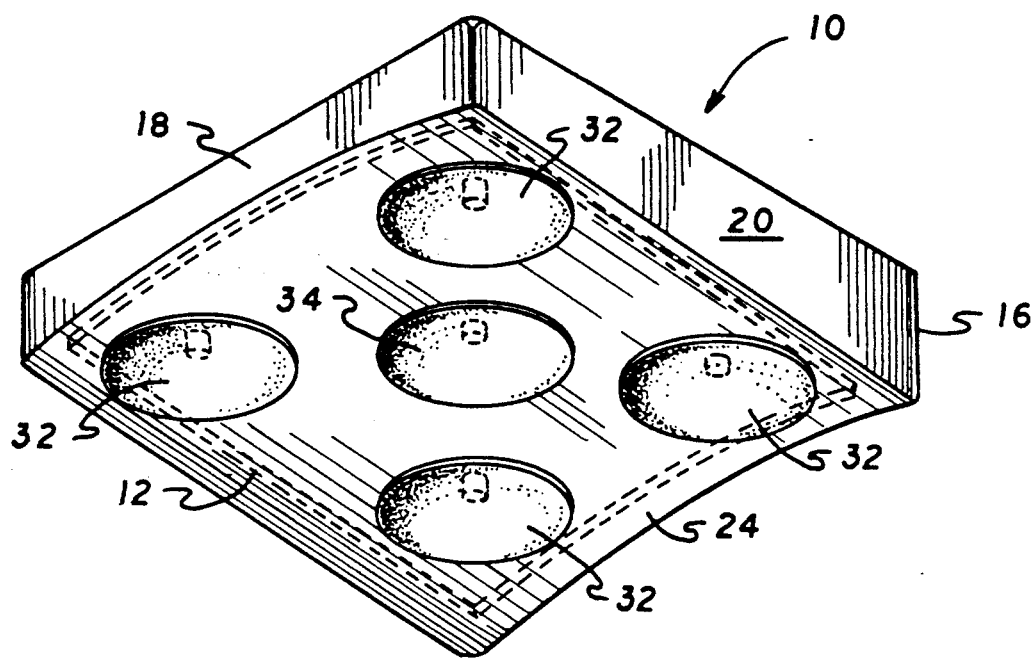
FIG. 4 is a bottom perspective view of the removable motorcycle fender seat showing the arcuate nature of the seat, the suction cup pattern on the base member of the seat, as well as the front to back taper thereof.

Referring back to sidewalls 16, 18, 20, and 22 (see FIGS. 3 and 4), it is clearly seen that front wall 16 has linear top and side edges abutting top surface 14 and side walls 20 and 22, but has an arcuate bottom edge engaging base member 24. In a similar fashion, rear wall 18 also has linear top and side edges abutting top surface 14 and sidewalls 20 and 22, respectively, but an arcuate bottom edge engaging base member 24. Consequently, it is stated that base member 24 is arcuately shaped so as to have substantially the same radius of curvature as the lateral radius of curvature of fender 102. So as to accommodate for the longitudinal radius of curvature of fender 102, fender seat 10 is linearly tapered along the bottom right and left facing walls 20 and 22, respectively. Thus, all four edges of sidewalls 20 and 22 are seen as linear.

Figure 5:
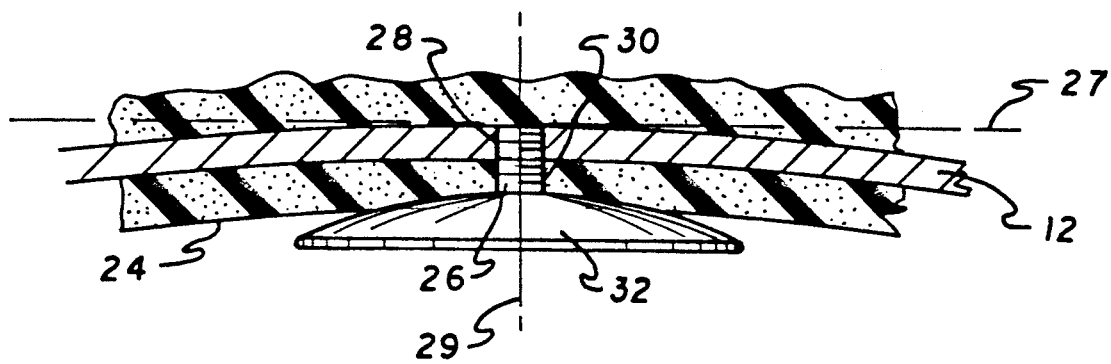
FIG. 5 is a detail sectional view of FIG. 2 illustrating a single suction cup as attached to the magnetic sheet, and drawn to an enlarged scale.

Inserted with fender seat 10, adjacent base member 24 is multi-purpose magnetic sheet 12 also having a radius of curvature substantially equal to the lateral radius of curvature of fender 102. The primary function of magnetic sheet 12 is to provide a means of securing fender seat 10 to fender 102 of motorcycle 100. Magnetic forces exerted on fender 102 by magnetic sheet 12, draw the two elements together securing fender seat 10 to fender 102. A secondary function of magnetic sheet 12 is to provide structure support for the lightweight material used to construct fender seat 10. A third and final function of the magnetic sheet is to engage a plurality of threaded members 26, 26 ,26, 26, 26 within a corresponding plurality of threaded cylindrical bores 28, 28, 28, 28, 28 located within magnetic sheet 12. Cylindrical bores 28, 28, 28, 28, 28 are tapped into magnetic sheet 12 such that longitudinal centerlines 29, 29, 29, 29, 29 of the cylindrical bores 28, 28, 28, 28, and 28 are normal to tangent lines 27, 27, 27, 27, 27 on magnetic sheet 12 which bisect the cross-section of the bores 28, 28, 28, 28, and 28 (see FIG. 5). Hence when suction cups 32, 32, 32, 32, and 34 are attached to threaded members 26, 26 ,26, 26, and 26, they will be positioned on such a manner that they will all engage fender 102 at right angles thereto, allowing for the most efficient usage of the suction cups. In the preferred embodiment, suction cups 32, 32, 32, and 32 are place adjacent the four corners of base member 24. The fifth suction cup, suction cup 34, is placed in the approximate geometric center of base member 24.

Accordingly, since threaded members 26, 26 ,26, 26, and 26 are used to connect suction cups 32, 32, 32, 32, and 34 to magnetic sheet 12 which is imbedded within fender seat 10, a corresponding plurality of smooth cylindrical bores 30, 30, 30, 30, 30 are located within base member 24, adjacent magnetic sheet 12, and centered on longitudinal centerlines 29, 29, 29, 29, 29 so as to allow the passage of threaded members 26, 26 ,26, 26, and 26 therethrough. Furthermore, as cylindrical bores 30, 30, 30, 30, 30 progress from adjacent magnetic sheet 12 towards base member 24, they are seen as funneling out in a shallow fashion to partially seat suction cups 32, 32, 32, 32, and 34 therewithin. This funneling out of cylindrical bores 30, 30, 30, 30, 30 along with the low height of suction cups 32, 32, 32, 32, and 34, stabilizes fender seat 10 onto fender 102, in an effort to prevent any shear slippage of suction cups 32, 32, 32, 32, and 34 that may be experienced while motorcycle 100 is in motion with a second passenger sitting on fender seat 10.

Additional embodiments of removable motorcycle fender seat 10 may be seen in FIGS. 6 and 7. FIG. 6 illustrates a removablemotorcycle fender seat 10m constructed of the same material as removable motorcycle fender seat 10. However, due to rider preference and different motorcycles, some individuals may prefer a removable motorcycle fender seat 10m having only a magnetic sheet 12m for securing removable motorcycle fender seat 10m onto a fender 102 of a motorcycle 100 in order to transport the additional rider. Since magnetic sheet 12m is the only fastening means utilized in this second embodiment, magnetic sheet 12m has been moved closed to bottom surface 24m, of seat 10m. As in the first embodiment of removable motorcycle fender seat 10, magnetic sheet 12m has the same shape and contours as previously described magnetic sheet 12. Furthermore, FIG. 7 illustrates a third embodiment of the present invention, removable motorcycle fender seat 10s. Removable motorcycle fender seat 10s is constructed of the same material as removable motorcycle fender seat 10, with the exception of magnet sheet 12, which is not incorporated into removable motorcycle fender seat 10s. Removable motorcycle fender seat 10s is secured to fender 102 of motorcycle 100 by a plurality of suction sup fasteners 32s . . . 32s, and 34s. Suction cup fasteners 32s . . . 32s and 34s are distributed across bottom surface 24s of seat 10s in the same configuration as seen in the first embodiment of removable motorcycle fender seat 10; that is, one suction cup fastener 32s placed at each corner of bottom surface 24s and one suction cup fastener 34s in the approximate geometric center thereof. Substantially smooth extension members 26s . . . 26s are used to connect suction cups 32s . . . 32s, and 34s within a corresponding plurality of smooth cylindrical bores 30s . . . 30s located within base member 24s and centered on longitudinal centerlines 29s . . . 29s so as to allow the passage of substantially smooth members 26s . . . 26s therethrough. Glue 108 is used to secure substantially smooth members 26s . . . 26s within smooth cylindrical bores 30s . . . 30s. Furthermore, as smooth cylindrical bores 30s . . . 30s progress from the end within seat 10s towards base member 24s, they are seen as funneling out in a shallow fashion to partially seat suction cups 32s . . . 32s and 34s therewithin. This funneling out of cylindrical bores 30s . . . 30s along with the low height of suction cups 32s . . . 32s, and 34s, stabilizes fender seat 10 onto fender 102, in an effort to prevent any shear slippage of suction cups 32s . . . 32s, and 34s that may be experienced while motorcycle 100 is in motion with a second passenger sitting on fender seat 10.

It is to be understood that the present invention is not limited to the sole embodiment described above, but encompasses any and all embodiments within the scope of the following claims.

We claim:

1. A removable motorcycle fender seat to be mounted onto an arcuate fender of a motorcycle, wherein said fender has both a longitudinal arcuate section and a lateral arcuate section, said removable motorcycle fender seat comprising:

a seat of substantially rigid material capable of supporting the human body, and having a horizontal, planar top surface with distinct vertical, downward extending sidewalls that intercept a base member, said base member having an arcuate contour that has substantially the same radius of curvature as the fender lateral arcuate section;

said seat having a magnetic sheet, also of substantially the same radius of curvature as said fender lateral arcuate section; and said magnetic sheet having means for receiving and securing a plurality of suction cup fasteners comprising a corresponding plurality of bores within said magnetic sheet, said plurality of suction cup fasteners engaging said magnet sheet through means defining a corresponding plurality of openings within a lower surface of said base member of said seat.

2. The removable motorcycle fender seat according to claim 1, wherein:

said downward extending sidewalls comprise four distinct walls that extend downward from said horizontal, planar top surface which has a rectangular shape, and connecting to said base member, said base member also having a rectangular shape, said downward extending sidewalls comprising: a first, forward facing, sidewall having an arcuate lower edge, which has, the same radius of curvature as said fender lateral arcuate section; a second, rearward facing, sidewall having also having the same radius of curvature as said first sidewall lower edge but being shorter in height than said first sidewall; a third sidewall and a fourth sidewall, which are left and right facing walls, respectively, that connect said first and said second sidewalls, the height of both said third and said fourth sidewalls height being taller at the lines of engagement with said first sidewall and tapering to a shorter heights at lines of engagement with said second sidewall, and said third and said fourth sidewalls having only linear, non-arcuate edges.

3. The removable motorcycle fender seat according to claim 2, wherein:

said corresponding plurality of bores within said magnetic sheet are tapped so as to receive said plurality of suction cups which engage said magnetic sheet by means of threaded members which extend from said suction cups into said tapped bores within said magnetic sheet.

4. The removable motorcycle fender seat according to claim 2, wherein:

said plurality of suction cup fasteners is five in number, a suction cup being located at each of the four corners of said rectangular base member of said seat, and a fifth suction cup being located at the approximate geometric center of said base member.

5. The removable motorcycle fender seat according to claim 1, wherein:

said substantially rigid material capable of supporting the human body is a closed-cell, foam, structure.

6. The removable motorcycle fender seat according to claim 1, wherein:

said corresponding plurality of bores within said magnetic sheet are tapped so as to receive said plurality of suction cups which engage said magnetic sheet by means of threaded members which extend from said suction cups into said tapped bores within said magnetic sheet.

7. The removable motorcycle fender seat according to claim 1, wherein:

said magnetic sheet is encased within said seat, and is disposed parallel to and slightly above said base member.

8. A removable motorcycle fender seat to be mounted onto an arcuate fender of a motorcycle, wherein said fender has both a longitudinal arcuate section and a lateral arcuate section, said removable motorcycle fender seat comprising:

a seat of substantially rigid material capable of supporting the human body, and having a horizontal, planar top surface with distinct vertical, downward extending sidewalls that intercept a base member, said base member having an arcuate contour that has substantially the same radius of curvature as the fender lateral arcuate section;

said seat having insertably incorporated therein a magnetic sheet, also of substantially the same radius of curvature as said fender lateral arcuate section, said magnetic sheet securing said seat to the fender of the motorcycle.

9. The removable motorcycle fender seat according to claim 8, wherein:

said downward extending sidewalls comprise four distinct walls that extend downward from said horizontal, planar top surface which has a rectangular shape, and connecting to said base member, said base member also having a rectangular shape, said downward extending sidewalls comprising: a first, forward facing, sidewall having an arcuate lower edge, which has, the same radius of curvature as said fender lateral arcuate section; a second, rearward facing, sidewall having also having the same radius of curvature as said first sidewall lower edge but being shorter in height than said first sidewall; a third sidewall and a fourth sidewall, which are left and right facing walls, respectively, that connect said first and said second sidewalls, the height of both said third and said fourth sidewalls height being taller at the lines of engagement with said first sidewall and tapering to a shorter heights at lines of engagement with said second sidewall, and said third and said fourth sidewalls having only linear, non-arcuate edges.

10. The removable motorcycle fender seat according to claim 8, wherein:

said substantially rigid material capable of supporting the human body is a closed-cell, foam, structure.

11. The removable motorcycle fender seat according to claim 8, wherein:

said magnetic sheet is encased within said seat, and is disposed parallel to and slightly above said base member.

12. A removable motorcycle fender seat to be mounted onto an arcuate fender of a motorcycle, wherein said fender has both a longitudinal arcuate section and a lateral arcuate section, said removable motorcycle fender seat comprising:

a seat of substantially rigid material capable of supporting the human body, and having a horizontal, planar top surface with distinct vertical, downward extending sidewalls that intercept a base member, said base member having an arcuate contour that has substantially the same radius of curvature as the fender lateral arcuate section;

said seat having a plurality of suction cups fasteners, receiving means for said plurality of suction cup fasteners, and securing means for retaining said plurality of suction cup fasteners comprising a corresponding plurality of bores within said seat, said receiving means for said plurality of suction cup fasteners comprising means defining a corresponding plurality of openings within a lower surface of said base member of said seat; wherein said downward extending sidewalls comprise four distinct walls that extend downward from said horizontal, planar top surface which has a rectangular shape, and connecting to said base member, said base member having a rectangular shape, said downward extending sidewalls comprising: a first, forward facing sidewalls having an arcuate lower edge, which has, the same radius of curvature as said first fender lateral arcuate section; a second, rearward facing, sidewall having the same radius of curvature as said first sidewall lower edge but being shorter in height than said first sidewall; a third sidewall and a fourth sidewall, which are left and right facing walls, respectively, that connect said first and second sidewalls, the height of both said third and said fourth sidewalls height being taller at the lines of engagement with said first sidewall and tapering to a shorter height at lines of engagement with said second sidewall, and said third and said fourth sidewalls having only linear, non-arcuate edges.

13. The removable motorcycle fender seat according to claim 12, wherein:

said securing means for retaining said plurality of suction cup fasteners within said bores within said seat is glue.

14. The removable motorcycle fender seat according to claim 12, wherein:

said plurality of suction cup fasteners is five in number, a suction cup being located at each of the four corners of said rectangular base member of said seat, and a fifth suction cup being located at the approximate geometric center of said base member.

15. The removable motorcycle fender seat according to claim 12, wherein:

said substantially rigid material capable of supporting the human body is a closed-cell, foam, structure.

* * * * *